Jan. 16, 1968     H. A. KNELL ETAL     3,363,711
MECHANISM FOR STEERING FOLLOW-UP LINKAGE
Filed Feb. 3, 1966     5 Sheets-Sheet 1
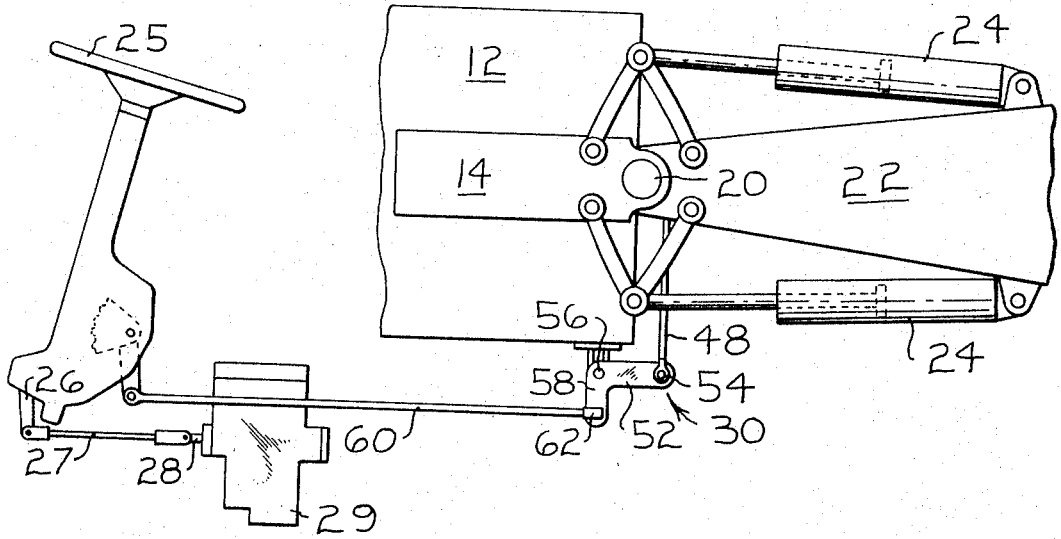
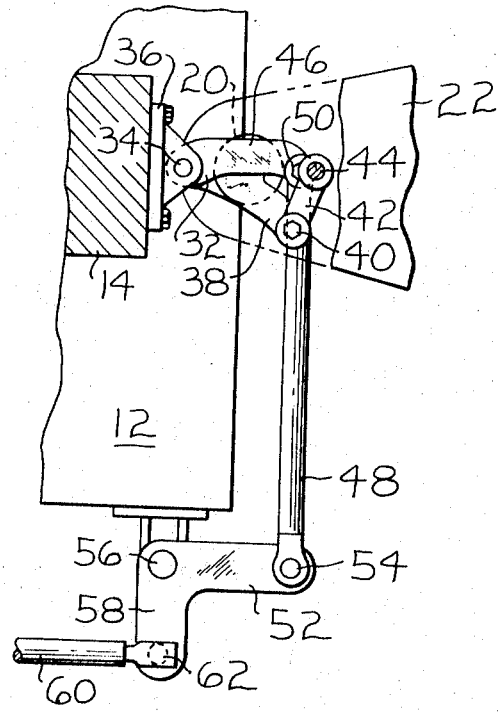
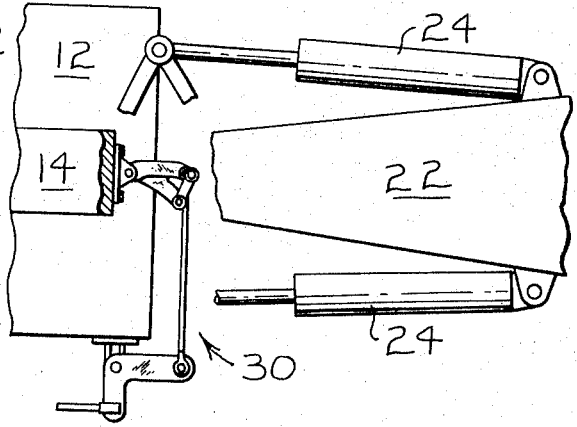
INVENTORS.
HARVEY A. KNELL
BARRY A. SCOGGIN
ATTORNEYS

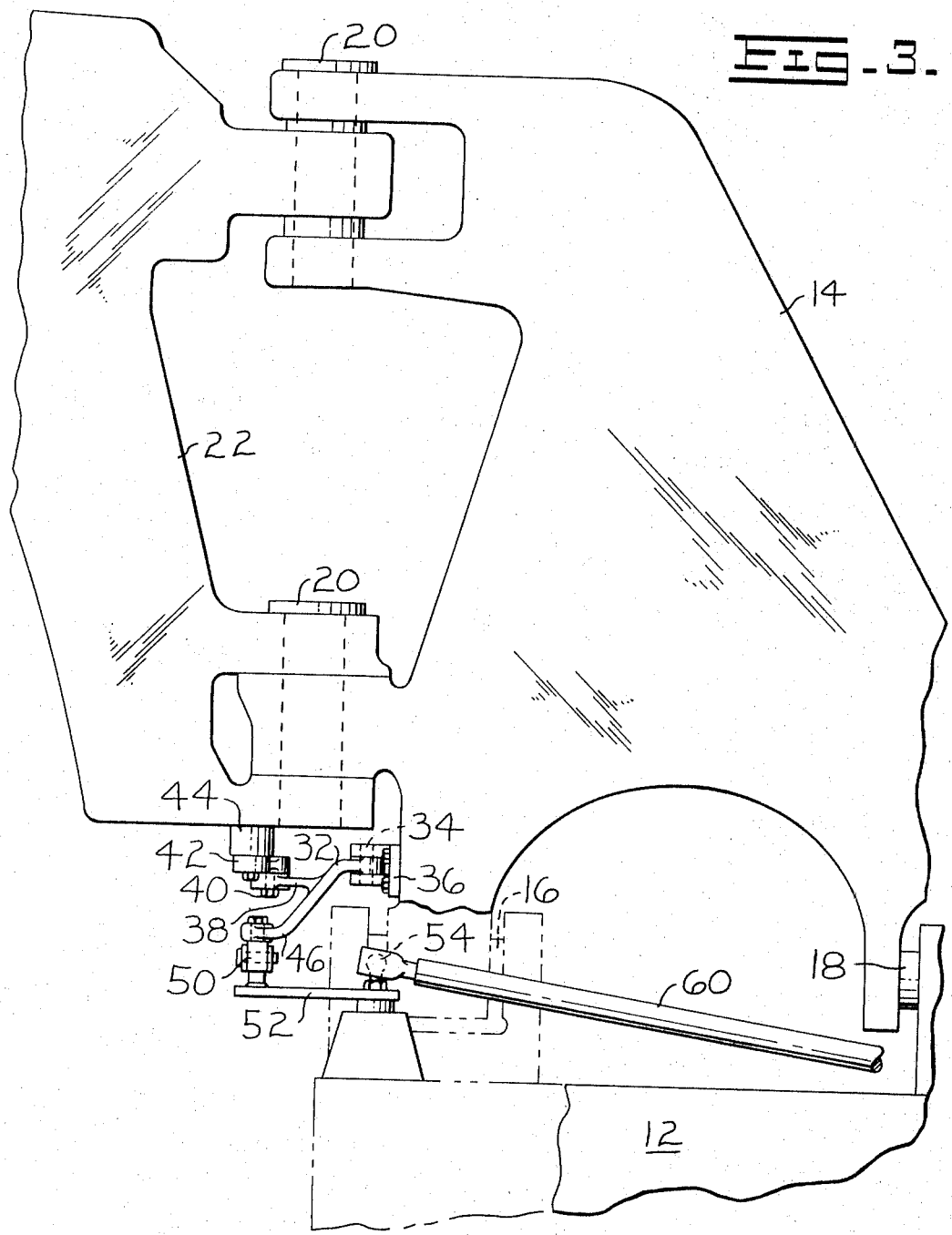

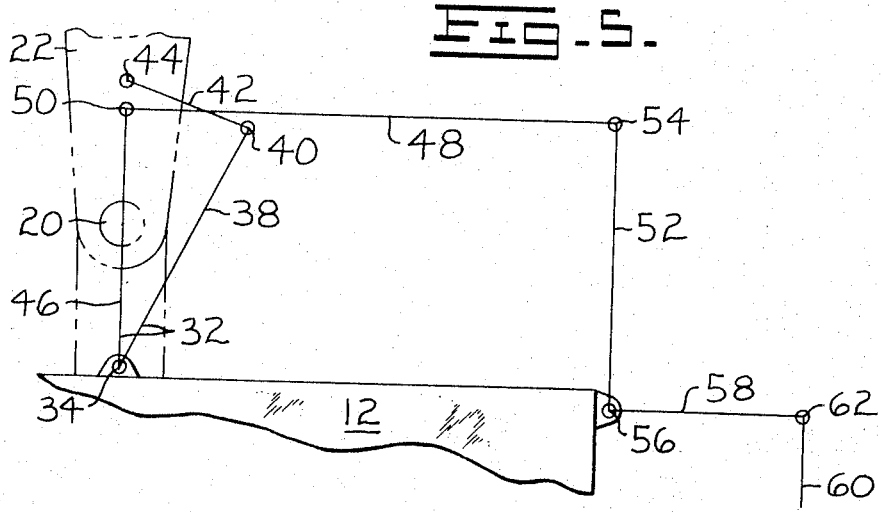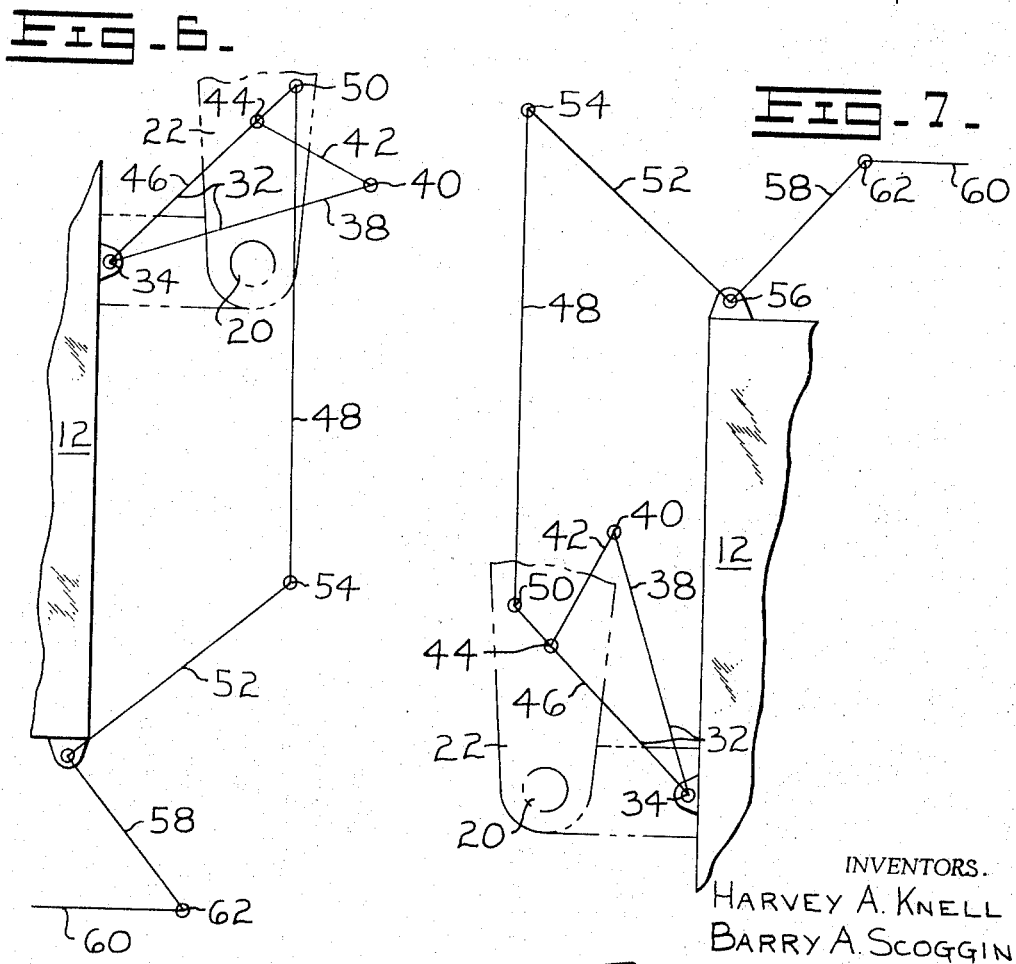

Figure 8:
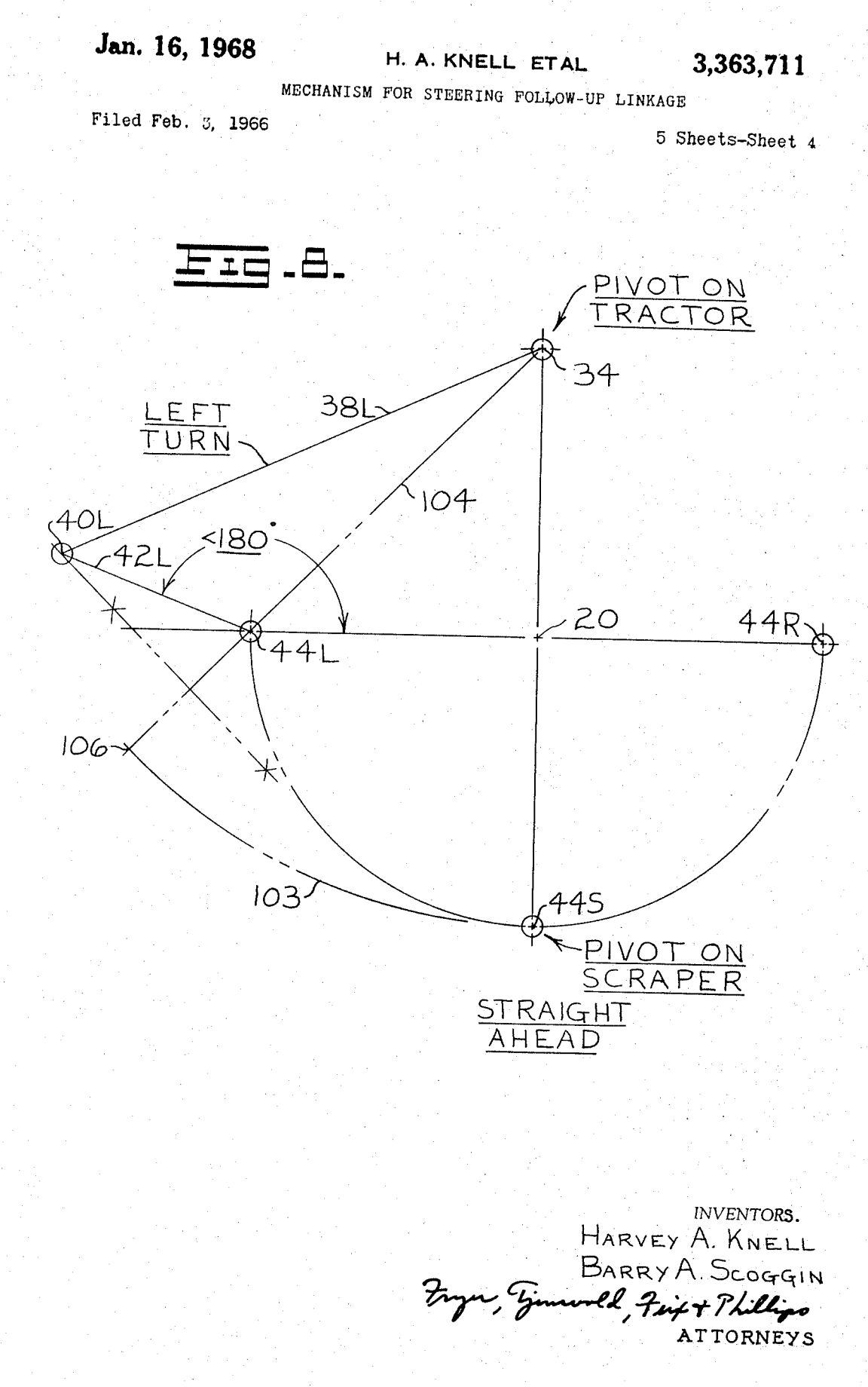

Jan. 16, 1968 H. A. KNELL ETAL 3,363,711
MECHANISM FOR STEERING FOLLOW-UP LINKAGE
Filed Feb. 3, 1966

PIVOT ON TRACTOR
34
LEFT TURN
38L
40L
42L
<180°
104
44L
20
44R
106
103
44S
PIVOT ON SCRAPER
STRAIGHT AHEAD

INVENTORS.
HARVEY A. KNELL
BARRY A. SCOGGIN
Fryer, Tjensvold, Feix + Phillips
ATTORNEYS

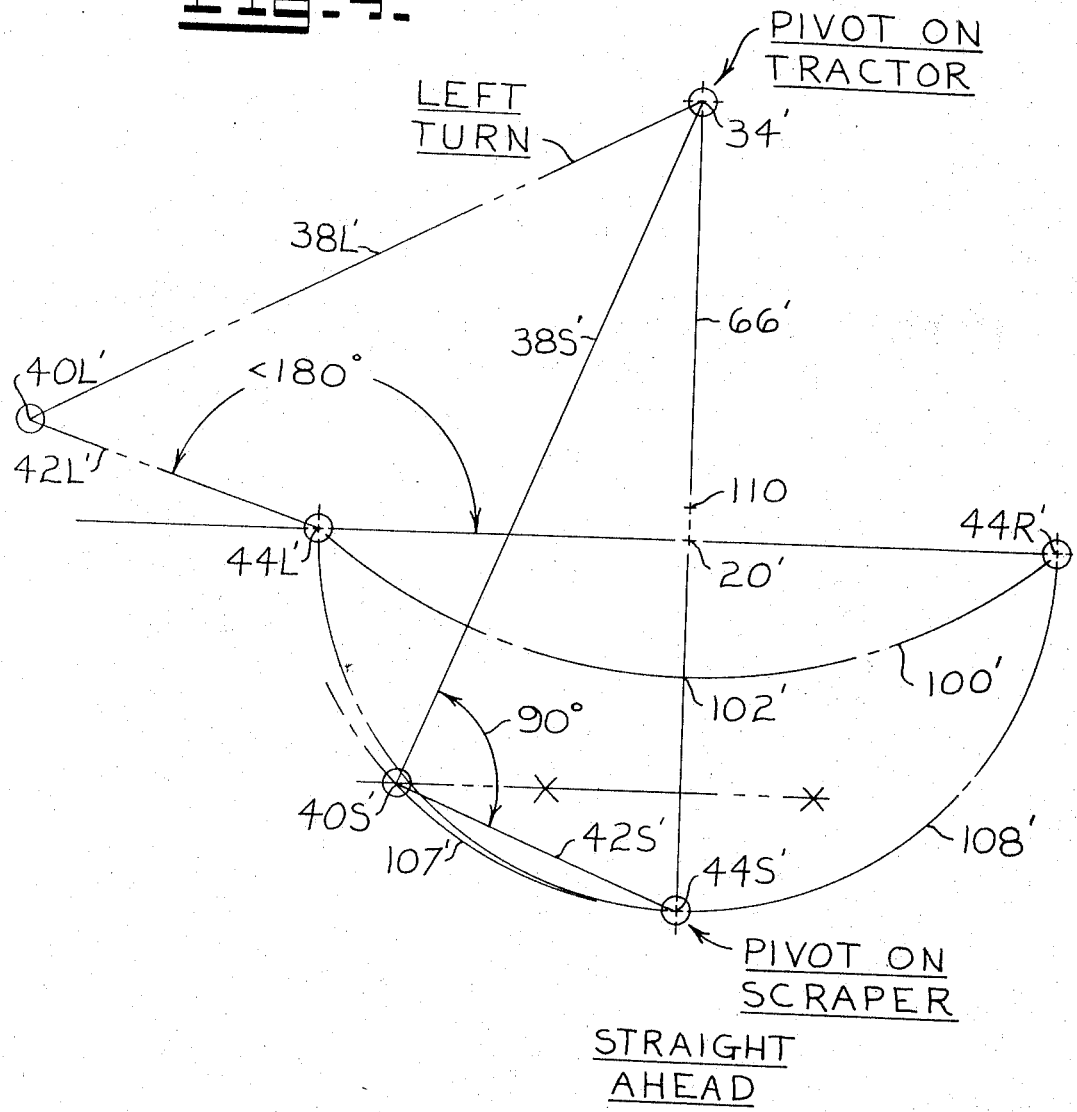

United States Patent Office 3,363,711
Patented Jan. 16, 1968

3,363,711
MECHANISM FOR STEERING FOLLOW-UP
LINKAGE
Harvey A. Knell, Joliet, and Barry A. Scoggin, Plainfield, Ill., assignors to Caterpillar Tractor Co., Peoria, Ill., a corporation of California
Filed Feb. 3, 1966, Ser. No. 524,912
5 Claims. (Cl. 180—79.2)

ABSTRACT OF THE DISCLOSURE

Improved steering follow-up linkage for a tractor-trailer combination wherein the linkage is constructed to provide substantially linear proportional feedback to a steering control valve to thereby prevent oversteering.

---

This invention relates to an improved mechanism adapted for use in the follow-up linkage of a steering system between a tractor and trailer. The invention is especially useful in connection with the steering of a two-wheel tractor employed in drawing a vehicle or implement such as a scraper and will be illustrated and described herein in such application though there are numerous other uses to which it may be put.

In the past, several different types of hydraulic steering controls have been provided for two-wheel tractors comprising hydraulic jacks which are supplied with fluid pressure controlled by the tractor steering wheel and including feedback follow-up linkages which function to hold a hydraulic steering control valve in a neutral position when the steering wheel is not being turned and return the hydraulic steering valve to a neutral position after rotation of the steering wheel is stopped.

In general, such follow-up mechanisms act as a steering stabilizer to give the operator the usual feel of steering. However, presently known follow-up linkages have a disadvantage in that oversteering occurs at the extreme turned positions. The above disadvantage is due to a decrease in linearity of feedback movement of the linkage in response to a given degree of tractor turning relative to the scraper. This decrease in linearity of feedback movement of the linkage, as the tractor approaches the extreme steered position in either direction, results in oversteering due to failure of the follow-up mechanism to provide enough feedback to return the control valve to its neutral position.

Accordingly, it is the principal object of this invention to provide an improved follow-up linkage having a near constant linear movement throughout the entire steering range (e.g. at least 180°) whereby the steering control valve is returned to the neutral position coincident with stoppage of steering wheel rotation.

Another related object of the invention is to provide an improved follow-up linkage having means for proportionately reducing the amount of angular movement transmitted through the linkage by rotation of the tractor relative to the scraper.

A still further object of the invention is to provide an improved follow-up linkage which will provide symmetrical motion in response to angular movement by the tractor to each side of the longitudinal center line of the tractor-scraper.

Further objects and advantages of the invention are made apparent in the following specification wherein reference is made to the accompanying drawings disclosing a preferred form of the invention.

In the drawings:

FIG. 1 is a schematic view showing a tractor steering wheel in side elevation and the tractor-scraper steering mechanism controlled thereby in plan;

FIG. 2 is a plan view with parts broken away illustrating a follow-up linkage in accordance with the invention;
FIG. 3 is an enlarged side view of the follow-up linkage;
FIG. 4 is a plan view partially in section of the follow-up linkage of FIG. 3;
FIGS. 5–7 are schematic views illustrating movement of the follow-up linkage as the tractor turns relative to the scraper;
FIG. 8 is a schematic view illustrating a method of determining various optimum relationships between certain of the elements comprising the follow-up linkage; and
FIG. 9 is a schematic view illustrating an alternative method of determining various optimum relationships between certain of the elements comprising the follow-up linkage.

Referring to FIGS. 1 and 3, the rear portion of a tractor is shown at 12. An A-frame 14 is pivotally connected to the tractor 12 by a pair of horizontally arranged coaxial connections 16 and 18 which are disposed on the longitudinal center line of the vehicle (see FIG. 3). The A-frame 14 is also pivotally connected by a pair of vertically disposed spaced pivots 20 to the forward end of a scraper draft frame 22 forming the main pivot axis to permit turning the tractor with respect to the scraper.

Conventional steering means include a pair of hydraulic jacks 24. Extension of one jack and retraction of the other obviously causes pivotal movement of the frames 14 and 22 about the pivot pins 20, and therefore results in steering of the articulated vehicle. This steering is accomplished through a steering wheel 25 at the operator's station through a system which is basically old and disclosed, for example, in U.S. Patents 2,614,644 to Gustafson and 2,846,848 to Coker. This system will be briefly described herein to facilitate an understanding of the improvements thereto which constitute the present invention.

Turning movement of the steering wheel 25 rocks the lever 26 which is connected by a link 27 with the spool 28 of a valve 29. The valve 29 may be of a well known type such, for example, as those disclosed in the patents referred to above. Movement of the spool in one direction directs hydraulic fluid to the jacks 24 to extend one jack and retract the other. Upon movement of the spool in the opposite direction, the opposite jack is extended while the other is retracted to provide for steering in either direction.

It is common practice in steering mechanisms of this kind to prevent continuous steering upon slight turning of the steering wheel by employing follow-up linkage (shown generally at 30 in FIG. 1), the function of which is to return the control valve 29 to normal positions each time that turning movement of the steering wheel is discontinued.

The improved follow-up linkage of the present invention comprises a forked lever 32 (see FIGS. 2, 3 and 4) having a common portion pivotally secured to the lower rear of A-frame 14 by a pivot pin 34 in bracket 36 which is disposed on the longitudinal center line of the vehicle and slightly ahead of the main steering pivot axis at 20. One arm 38 of the bifurcated lever 32 is pivotally attached at 40 to a link 42, which in turn is pivotally attached as at 44 to draft frame 22 of the scraper. The arm 46 of lever 32 is attached by a universal connection 50 to one end of a link 48, whose other end is attached to one arm of a bellcrank 52 by a ball and socket connection 54. Bellcrank 52 is pivotally supported on tractor 12 as indicated at 56, and has its other arm 58 pivotally connected to one end of a rod 60 by a ball and socket connection 62. The other end of the rod 60 connects to the lever of a steering gear assembly which operates to return the steering valve 29 to neutral position when rotation of the steering wheel 25 is stopped in a manner similar to that disclosed in U.S. Patent 2,614,644 to Gustafason.

The schematic illustration of FIG. 5 discloses the follow-up mechanism with the tractor in a straight-ahead position and wherein the pivot 34 of lever 32 and pivot 44 of link 42 are spaced equidistant from pivot 20. It should be noted that with the tractor in a straight-ahead position, the pivots 20, 34, 44 and 50 are disposed on a common line extending longitudinally of the tractor. The pivot 50 should be on the center line of the machine to prevent oscillation of the tractor relative to A-frame 14 from changing the distances between pivots 50 and 54, which action would cause the tractor to be steered each time oscillation occurred.

In order to minimize the forces in the linkage, the link 42 and lever 38 should form an angle of 90° when the tractor-scraper is in a straight-ahead position.

In turning of the vehicle, clockwise 90° rotation of tractor frame 12 about the steering axis 20, shown in FIG. 6, results in approximately 45° counterclockwise rotation of lever 32 about its pivot 34 with respect to the longitudinal center line of the tractor-scraper. Rotation in degrees of tractor-scraper to rotation of lever 32 is substantially proportional throughout the 90° turn. This action is transmitted, even in extreme steered positions in either direction, through link 48, bellcrank 52 and rod 60 to the steering assembly to return the steering valve 29 to neutral after rotation of the steering wheel 25 has stopped. Linear movement of rod 60 may be adjusted somewhat by proper proportioning of the arms of the bellcrank with respect to lever 32 and each other to achieve the desired amount of movement at the connection between rod 60 and the steering gear pitman arm.

FIG. 7 discloses the arrangement with counterclockwise 90° rotation of tractor frame 12 about steering axis 20 resulting in clockwise rotation of lever 32 about its pivot 34 with respect to the longitudinal center line of the tractor-scraper. This action, similar to that of FIG. 6, is transmitted through link 48, bellcrank 52 and rod 60 to the steering assembly to return the steering valve to the neutral position when the operator stops the steering wheel.

The distance pivots 34 and 44 are from pivot 20 can be varied from the equidistant arrangement of FIGS. 5–7 thereby giving design flexibility to the linkage. The pivot point 40 and the proper length ratio between arm 38 of lever 32 and link 42 should be determined according either to the process illustrated in FIG. 8 or the process illustrated in FIG. 9 in order to preserve the aforementioned symmetrical action feature of the invention.

In FIG. 8, and with the distances of pivots 34 and 44 from pivot 20 established, an arc is drawn representing the amount pivot 44 would rotate to the right and left about 20. This movement may be 90° to each side of center as represented by 44L and 44R in the subject follow-up linkage or, to an amount of angular rotation more or less than 90° as desired. An arc 103 having a radius of 34–44 is then constructed about pivot 34 and intersects a line 104 drawn through pivots 34 and 44L at point 106. A perpendicular bisector of line segment 44L–106 is then constructed. Pivot point 40L for links 42 and 38 is located on this perpendicular bisector such that an angle formed by a line drawn through pivots 20, 44L and 40L is less than 180° or, in effect, on the perpendicular bisector above an extension of a line drawn from pivot 20 through 44L. This location eliminates any possibility of the linkage crossing over center in its movement and prevents a motion reversal problem. The location of pivot point 40L determines the lengths of links 38 and 42 and the perpendicular bisector is the locus of all points fulfilling the requirements of the linkage. In order to minimize the forces in the linkage, pivot point 40L should be located such that when the linkage is rotated to the straight-ahead position the angle formed by the links 38 and 42 is substantially 90°.

An alternate method of constructing the lever 38 and link 42 to an exact 90° relationship which minimizes the forces in the linkage is shown in FIG. 9. With the distances of pivots 34′ and 44S′ from pivot 20′ established in a straight-ahead position, an arc 108′ having a radius of the distance between 20′ and 44S′ is drawn about pivot 20′ representing the amount pivot 44S′ would rotate to the right and left. This movement may be 90° to each side of straight-ahead as represented by 44L′ and 44R′ in the subject follow-up linkage or to an amount of angular rotation more or less than 90° as desired. An arc 100′ is then constructed from pivot 34′ intersecting pivots 44L′ and 44R′ in the extreme left and right positions and intersecting line 66′ at 102′. An arc 107′ having a radius of one-half the distance between the pivots 34′ and 44S′ is drawn from a point indicated at 110. Any point on arc 107′ will provide an exact 90° relationship between lever 38 and link 42 with the mechanism in a straight-ahead position. A perpendicular bisector of line segment 102′–44S′ is then constructed and extended until it intersects arc 107′. The intersection of arc 107′ with the perpendicular bisector is the proper location for pivot 40S′ to insure that the motion of the linkage will be symmetrical when frame 14 is rotated to the right and left turn positions as previously described. This method of constructing the linkage will hold true regardless of the distance 34′ and 44S′ are from pivot 20′ or the amount of angular rotation of the linkage. It should be noted, however, that if the pivot 20′ is equidistant from pivots 34′ and 44S′, arcs 107′ and 108′ will be coincident. However, the above-described linkage must be rotated to the extreme turned position (left turn in FIG. 9) to determine if the pivot point 40S′ is above (as viewed in FIG. 9) an extension of a line drawn from pivot 20′ through 44L′. The latter step must be carried out to insure that the linkage does not cross over center in its movement which would create a motion reversal problem.

Thus, the follow-up linkages disclosed achieve the objects of the invention in that they proportionately reduce the angular movement while still transmitting symmetrical action to each side of the longitudinal center line of the tractor-scraper. Since lever 32 and bellcrank 52 are rotated through the most active portion of their arcs with respect to link 48 and rod 60, substantially linear proportional feedback is always transmitted to the steering control valve thereby preventing oversteering.

We claim:

1. A mechanism adapted for use in the follow-up linkage of a steering system between a tractor and trailer which system includes a main pivot connection between said tractor and trailer and a hydraulic circuit having a steering control valve located on said tractor for feeding back angular displacement between said tractor and trailer to said valve, comprising: means for transforming angular motion between the tractor and trailer to substantially linear motion for actuating said control valve including a lever spanning said main pivot connection and pivoted to both said tractor and said trailer, said lever comprising two arms having a common portion which is pivotally connected by a first pivot to said tractor, a first arm portion which is pivotally connected by a second pivot to linkage means for operating said steering control valve, a second arm portion fixed for movement with said first arm portion, and a link pivotally connected by a third pivot to said second arm portion and by a fourth pivot to said trailer.

2. A follow-up linkage as set forth in claim 1 wherein said main pivot connection, said first pivot, said second pivot and said fourth pivot are all located on the longitudinal center line of said tractor-trailer.

3. A follow-up linkage as set forth in claim 2 wherein said link forms an angle of substantially 90° with said second arm portion when said tractor-trailer is in a straight-ahead position.

4. A follow-up linkage as set forth in claim 1 wherein said third pivot is located on a first line defined by the perpendicular bisector of a second line that is the line segment between a first point, which first point is located at the end of an arc centered at said main pivot and representing the maximum extent that said fourth pivot would rotate about said main pivot, and a second point representing the intersection of a third line and a second arc, said third line passing through said first point and said first pivot and said second arc centered about said first pivot and having the greatest distance between said main pivot and said fourth pivot as a radius, said third pivot located on said first line such that the angle between said first line and a fourth line connecting said main pivot and said first line is less than 180°.

5. The follow-up linkage of claim 4 wherein said third pivot is located on said first line such that said link forms an angle of substantially 90° with said second arm portion when said tractor-trailer is in a straight-ahead position.

References Cited

UNITED STATES PATENTS

| | | | |
|---|---|---|---|
| 2,614,644 | 10/1952 | Gustafson | 180—79.2 |
| 2,841,231 | 7/1958 | Armington | 180—79.2 |
| 2,885,022 | 5/1959 | Rockwell | 180—79.2 |
| 2,896,754 | 7/1959 | Toth | 180—79.2 |
| 3,096,844 | 7/1963 | Sittel et al. | 180—79.2 |
| 3,130,806 | 4/1964 | Baer et al. | 180—79.2 |
| 3,312,301 | 4/1967 | Hagen | 180—79.2 |

BENJAMIN HERSH, *Primary Examiner.*

L. D. MORRIS, *Assistant Examiner.*